United States Patent
Arici et al.

(10) Patent No.: US 11,928,182 B1
(45) Date of Patent: Mar. 12, 2024

(54) ARTIFICIAL INTELLIGENCE SYSTEM SUPPORTING SEMI-SUPERVISED LEARNING WITH ITERATIVE STACKING

(71) Applicant: Amazon Technologies, Inc., Seattle, WA (US)

(72) Inventors: Tarik Arici, New York, NY (US); Vito Nicola Mandorino, Seattle, WA (US); Ismail Baha Tutar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 755 days.

(21) Appl. No.: 17/107,640

(22) Filed: Nov. 30, 2020

(51) Int. Cl.
*G06F 18/214* (2023.01)
*G06N 3/045* (2023.01)
*G06N 3/082* (2023.01)

(52) U.S. Cl.
CPC ...... *G06F 18/2148* (2023.01); *G06F 18/2155* (2023.01); *G06N 3/045* (2023.01); *G06N 3/082* (2013.01)

(58) Field of Classification Search
CPC .................................................. G06F 18/2148
USPC ......................................................... 706/15
See application file for complete search history.

(56) References Cited

U.S. PATENT DOCUMENTS

| | | | | |
|---|---|---|---|---|
| 7,480,640 | B1 * | 1/2009 | Elad ....................... | G06Q 10/10 706/14 |
| 8,244,652 | B2 * | 8/2012 | Menahem .............. | G06N 20/20 706/62 |
| 10,387,772 | B1 * | 8/2019 | Yang ...................... | G06F 18/254 |
| 10,438,212 | B1 * | 10/2019 | Jilani ...................... | G06N 5/025 |
| 10,990,645 | B1 * | 4/2021 | Shi .......................... | G06N 3/045 |
| 11,710,033 | B2 * | 7/2023 | Morris ..................... | G06N 3/04 706/15 |
| 2019/0303795 | A1 * | 10/2019 | Khiari ..................... | G06N 5/01 |
| 2019/0378049 | A1 * | 12/2019 | Widmann .......... | G06Q 20/4016 |
| 2020/0104673 | A1 * | 4/2020 | Michiels ................ | G06N 20/00 |
| 2020/0258634 | A1 * | 8/2020 | Ravindranathan ..... | G16H 50/70 |
| 2020/0302524 | A1 * | 9/2020 | Kamkar ................ | G06N 20/20 |
| 2021/0117869 | A1 * | 4/2021 | Plumbley .............. | G06F 18/217 |
| 2021/0150330 | A1 * | 5/2021 | Sharma ................... | G06N 3/08 |
| 2022/0124963 | A1 * | 4/2022 | Taylor ..................... | G06Q 50/02 |
| 2022/0198222 | A1 * | 6/2022 | Rawat ................... | G06F 18/2148 |
| 2022/0284295 | A1 * | 9/2022 | Baker ................... | G06N 3/045 |

(Continued)

OTHER PUBLICATIONS

Sesmero, M.P., Ledezma, A.I., and Sanchis, A., Generating ensembles of heterogeneous classifiers using stacked generalization. Wiley Interdisciplinary Reviews. Data Mining and Knowledge Discovery, 5 (1), 21-34. doi:10.1002/widm.1143. (Year: 2015).*

*Primary Examiner* — Reza Nabi
(74) *Attorney, Agent, or Firm* — Robert C. Kowert; Kowert, Hood, Munyon, Rankin & Goetzel, P.C.

(57) ABSTRACT

A plurality of training iterations is conducted for a machine learning task. A given iteration includes generating a version of a stacking model using a portion of a labeled data set. Proposed labels are then obtained in the iteration using the generated version of the stacking model for a set of unlabeled records. The unlabeled records and their proposed labels are then used to generate versions of base models for the iteration. After the training iterations are completed, a trained ensemble of models including the stacking model and the base models is stored.

20 Claims, 10 Drawing Sheets

(56) References Cited

U.S. PATENT DOCUMENTS

| | | | |
|---|---|---|---|
| 2023/0206029 A1* | 6/2023 | Qiao | G06N 3/042 |
| | | | 706/25 |
| 2023/0259621 A1* | 8/2023 | Li | G06F 21/563 |
| | | | 726/23 |
| 2023/0316156 A1* | 10/2023 | Kim | G06N 3/08 |
| | | | 706/12 |

* cited by examiner

ARTIFICIAL INTELLIGENCE SYSTEM SUPPORTING SEMI-SUPERVISED LEARNING WITH ITERATIVE STACKING

BACKGROUND

The use of machine learning algorithms is becoming increasingly popular for addressing numerous types of problems, including text analysis, image analysis and the like. Deep learning machine learning models, comprising multiple layers of neural networks, have been extremely successful in a number of problem domains. Such deep neural network based models (DNNs) discover several categories of salient characteristics of the input data, starting with low-level features at initial layers (such as rough boundaries between objects or regions in the case of image processing applications) and ending with fine-grained characterization of the input (e.g., distinguishing between different faces or animals) at the final layers closest to the output of the models.

Supervised learning of DNNs and other complex models requires large amounts of labeled examples. Typically, as the count of internal parameters to be learned in a model increases (which in turn may increase with the number of layers of a DNN and the dimensionality of the input data), the number of labeled examples needed also increases. Labeling traditionally involves manual annotation, which can be resource intensive and prone to errors.

In contrast to labeled examples, unlabeled data records pertinent to a machine learning task are often much easier to obtain, and can usually be accumulated with minimal effort. For example, large numbers of unlabeled photographs or videos which may be useful for some types of problems are available from various data sources, and text documents are also often freely available. Semi-supervised learning techniques attempt to learn from unlabeled data by creating label guesses and then using the guessed labels for training machine learning models. Unfortunately, at least some semi-supervised learning techniques suffer from problems such as over-fitting, which reduces the generalizability of the trained models.

Figure 1:
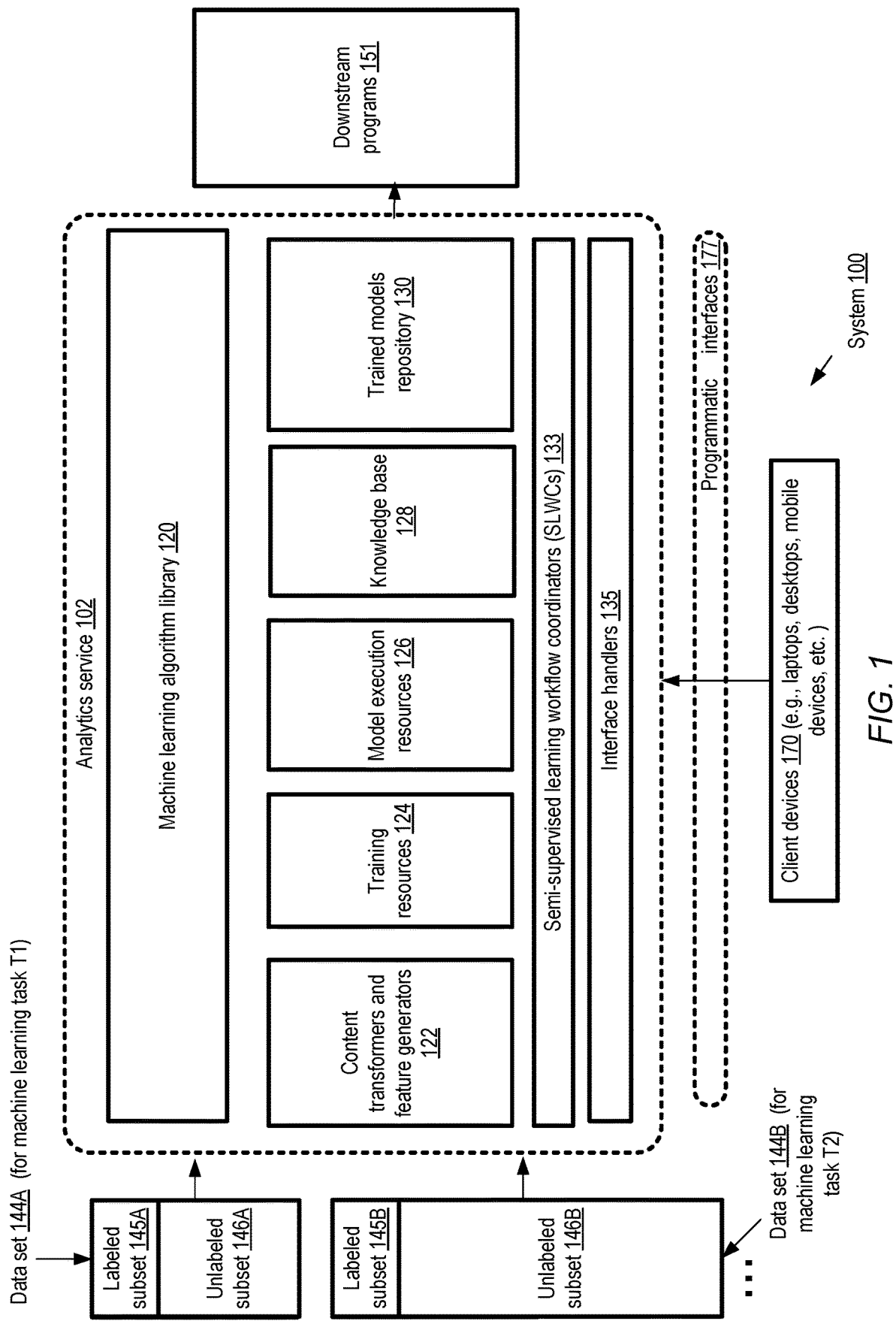
FIG. 1 illustrates an example system environment in which semi-supervised machine learning techniques involving iterative stacking may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for semi-supervised machine learning techniques for model ensembles, in which unlabeled data is used to iteratively train base models while labeled data is used to iteratively train a stacking model, and the base models and the stacking model are used in combination to generate predictions after the training is complete. As a result of using disjoint sets of input data for training the base models and the stacking model, the proposed technique avoids overfitting, which is a known problem for some traditional types of stacking-based ensemble preparation approaches. The proposed techniques, which may be referred to as iterative stacking, can be employed in a variety of scenarios using different types of base and stacking model algorithms; for example, it may be extremely beneficial for scenarios in which the base models comprise deep neural networks (DNNs).

Any of several different iterative stacking-based training strategies may be employed in different embodiments, e.g., based on factors such as the relative amount of labeled and unlabeled data available for the machine learning task to be performed, the problem domain being addressed by the task, the availability of derived features or feature generation tools for the labeled records, and so on. The strategies may differ from one another, for example, in the kind of machine learning algorithm used for the stacking model, the possible combinations of base models used, and so on. According to one such strategy, the collection of layers of a single large DNN may be split up into two subsets, one of which (closer to the input of the DNN) is used in effect as a collection of base models, while the other subset is used in effect as a stacking model. In another strategy, distinct machine learning models may be used as the base models and the stacking model—e.g., a collection of neural network based models implementing different internal architectures or using different hyper-parameter combinations may be used as base models, while a random forest model may be used as the stacking model. Regardless of the strategy chosen, the proposed iterative stacking based methodology enables the training of high quality ensembles of complex machine learning models using input data which is largely unlabeled to begin with.

As one skilled in the art will appreciate in light of this disclosure, certain embodiments may be capable of achieving various advantages, including some or all of the following: (a) substantially reducing the overall amount of computation, storage and networking resources required to prepare input data for complex training machine learning models which can generate high quality machine learning predictions for various problem domains such as image/video processing, audio processing or text processing, (b) improving the user experience of customers of applications implemented using machine learning, e.g., by enhancing the generalizability of the models used, thereby reducing the probabilities of erroneous predictions and/or (c) improving the user experience of data scientists and others responsible for preparation of machine learning models, e.g., by reducing the amount of feature engineering and other tasks that may be required for alternative approaches.

According to some embodiments, a system may comprise one or more computing devices, e.g., of an analytics service of a provider network or cloud computing environment. The computing devices may include instructions that upon execution on or across the one or more computing devices cause the one or more computing devices to obtain an indication of a machine learning task which includes prediction of at least a first target variable corresponding to respective input records. The instructions upon execution may cause the devices to automatically select a particular iterative training strategy to be used for the machine learning task from a plurality of iterative training strategies, based at least in part on factors such as (a) respective sizes of labeled and unlabeled data sets available for training one or more models for the machine learning task and/or (b) an indication of availability of one or more derived features corresponding to individual ones of the records of the labeled data set (e.g., whether feature generation tools are available for the labeled data, or whether values of derived features have already been obtained). The strategies may differ from one another, for example, in the type of machine learning model or algorithm utilized for stacking.

A plurality of training iterations of the selected strategy may be implemented in various embodiments at the computing devices until a training termination criterion is met. A particular training iteration may comprise several steps. One such step may include, for example, selecting or identifying a batch of unlabeled records from the unlabeled data set, such that the records of the batch have not already been utilized for a different iteration. Another step may comprise generating, using at least a portion of the labeled data set, a new version of a stacking model from an older version of the stacking model, where the older version corresponds to a previous training iteration. In at least some embodiments, the particular training iteration may further include obtaining, from the new version of the stacking model, respective proposed labels corresponding to individual records of the batch of unlabeled records. A different step may involve generating, using the records of the batch and the proposed labels, respective new versions of one or more base models from older versions of the one or more base models corresponding to the previous training iteration. The base models and the stacking model may collectively be referred to as an ensemble of models for the machine learning task. In various embodiments, input provided to the older versions of the one or more base models to generate their respective new versions may not include records of the labeled data set—the base models may be updated or trained using unlabeled data and associated proposed labels obtained from the stacking model. In contrast, the stacking model may be trained using the labeled data set (for which predictions may be obtained from the base models and provided as input to the stacking model) in at least some embodiments. In effect, the stacking model and the base models may be updated in a given training iteration using disjoint sets of training records to avoid overfitting in such embodiments.

After the training termination criterion is met (e.g., after all the unlabeled data batches have been processed, or until the overall prediction quality of the ensemble of base models and the stacking model reaches a desired level), final trained versions of all the models involved may be stored in various embodiments. Predicted values of the target variables of the machine learning task for new input records (which were not utilized in the training) may be obtained from the final trained versions of the ensemble of models in various embodiments.

As mentioned above, any of several different types of machine learning models may be used as the base models and the stacking model in various embodiments. In some embodiments, a random forest model may be used for the stacking model, while at least some of the base models may each comprise a respective DNN model. In one embodiment, some base models may implement a different algorithm than others: e.g., some may utilize neural networks with convolutional layers, while others may utilize various types of recurrent neural networks (such as long short-term memory units or LSTMs). In another embodiment, some base models may use neural networks, while others may not utilize neural networks. In at least one embodiment, the layers of a DNN model may be split into two disjoint groups: one group used as the equivalent of a collection of base models, and another group used as the equivalent of a stacking model. Such layer-splitting based base models and stacking models may be referred to respectively as virtual base models and virtual stacking models respectively.

In some embodiments, clients of an analytics service or tool used for the iterative stacking based techniques of the kind described above may submit various types of information and/or requests pertaining to the techniques via programmatic interfaces such as web-based consoles, command-line tools, application programming interfaces (APIs), graphical user interfaces and the like. For example, a request to train an ensemble of models for a machine learning task may be submitted via a programmatic interface, and training iterations involving base models and stacking models may be implemented in response to such a request. In one embodiment, a client may indicate the combination of models to be employed as based models and/or as the stacking model; in other embodiments, the analytics service may choose the kinds of models to be used as base models and/or stacking models. In some embodiments, preferred values of one or more hyper-parameters of the base models and/or the stacking models may be provided via such programmatic interfaces. In one embodiment, values of features for various input records used for the training, and/or indications of feature generation tools or programs to be used for the input records may be provided by clients via programmatic interfaces. In various embodiments, a visualization of the ensemble of models used may be provided via graphical or web-based user interfaces.

According to some embodiments, as suggested earlier, semi-supervised iterative learning techniques of the kind introduced above may be performed at a network-accessible analytics service of a provider network, e.g., in response to one or more programmatic requests directed to the analytics service by its clients. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations. Programmatic interfaces of the analytics service may be used by clients, for example, to specify various desired parameters and properties of the iterative stacking technique, such as the maximum amount of time for which the ensemble of models should be trained, the locations from which the input data is to be obtained, and so on.

Example System Environment

FIG. 1 illustrates an example system environment in which semi-supervised machine learning techniques involving iterative stacking may be implemented, according to at least some embodiments. As shown, system 100 of FIG. 1 comprises resources and artifacts of an analytics service 102, including a machine learning algorithm library 120, content transformers and feature generators 122, training resources 124, model execution resources 126, a knowledge base 128, a trained models repository 130, semi-supervised learning workflow coordinators (SLWCs) 133 and interface handlers 135. Each of the different subcomponents of analytics service 102 may comprise some combination of hardware and software of one or more computing devices in various embodiments.

At a high level, the semi-supervised learning workflow coordinators 133 may be responsible for orchestrating an iterative stacking based training technique to prepare ensembles of models to address various machine learning tasks with associated data sets 144 available for use during training in the depicted embodiment. For example, for a machine learning task T1, a data set 144A comprising a labeled subset 145A and an unlabeled subset 146A of records may be available for use in semi-supervised learning, while for machine learning task T2, a different data set 144B comprising a labeled subset 145B and an unlabeled subset 146B of records may be available for use in semi-supervised learning. Each of the machine learning tasks may require or involve the prediction of one or more target variables of input records similar to those stored in the corresponding data sets 144. The labeled subsets 145 of the data sets 144 may include values of the target variable(s) for various records, while the unlabeled subsets 146 may not comprise values of the target variable to be predicted.

The analytics service 102 may implement a set of programmatic interfaces 177 in the depicted embodiment, such as a web-based console, command-line tools, application programming interfaces (APIs), graphical user interfaces and the like. Clients of analytics service 102 may submit various types of requests, command or messages pertaining to machine learning tasks such as T1 and T2 via interfaces 177 in the depicted embodiment from a variety of client devices 170, such as laptops, desktops, mobile devices and the like, and receive corresponding responses. The requests, commands or messages directed to the analytics service 102 may be received and processed initially by a set of interface handlers 135, which may then transmit internal versions of the received messages to other subcomponents of the analytics service to perform the required work and provide results if needed.

According to at least some embodiments, a client may initiate the process of training an ensemble of models for a particular machine learning task and an associated data set by sending one or more requests providing respective descriptors or indicators of the task and the data set via the programmatic interfaces 177. In response to such a request or requests, an SLWC 133 may select a particular type of iterative stacking-based ensemble training strategy from among a plurality of strategies, e.g., based on factors such as the respective sizes of the labeled and unlabeled portion of the data set 144, the availability of features or feature generation tools for the data set 144, the problem domain being addressed, and so on. The strategies may differ from one another in the kinds (and number) of machine learning models used for stacking and/or as base models, whether the strategy requires the selection of a subset of layers of a DNN model as a stacking model or not, and or in other ways in various embodiments. The strategies may be referred to as semi-supervised in that they do not require all of the training data to be manually labeled in advance in various embodiments; instead, proposed labels may be generated for at least some unlabeled records of the data sets 144, and used to train at least some models of the ensemble. In some embodiments, if the ratio of the labeled portion to the unlabeled portion is below a threshold, or if the total number of records in the labeled portion is below a threshold, a strategy in which a tree-based model such as a random forest model is used as the stacking model may be selected. In one embodiment, if the ratio of labeled data to unlabeled data exceeds a threshold, a split-DNN strategy of the kind described below in further detail may be selected. In at least one embodiment, knowledge base 128 may comprise entries indicating the semi-supervised learning strategies that have worked well for different types of machine learning tasks implemented at the analytics service 102 in the past, and such entries may be utilized by the SLWC to select the strategy. For example, for some types of text analysis problems, the knowledge base 128 may indicate that a strategy that utilizes a random forest approach may work well, while for some image or video analysis tasks, the knowledge base may indicate that a split-DNN strategy may work better. In at least one embodiment, a preferred iterative stacking based strategy may be indicated by the client.

After a strategy has been identified, it may be implemented by the SLWC 133, e.g., using some combination of content transformers and feature generators 122 and training resources 124 in the depicted embodiment. For example, depending on the kinds of models used as base models and/or as the stacking model, some number of features to be used as input for one or more models may be automatically extracted using content transformers and/or feature generators 122. In one embodiment, for example, a client of the analytics service may provide an indication, via programmatic interfaces 177, of one or more feature generation programs, algorithms or techniques which are to be applied to the records of the data set 144 to generate the derived features needed for the training of some or all the models (and later, for execution of trained models of the ensemble).

A number of training iterations may be implemented at training resources 124 for a selected ensemble comprising some number of based models and at least one stacking model until a training termination criterion is satisfied in various embodiments. A given iteration may include selecting a batch $B_u$ of unlabeled records from the unlabeled portion 146 of the data set 144 pertaining to the machine learning task. The iteration may also comprise generating, using at least a portion of the labeled subset 145, a new or updated version of a stacking model from an older version of the stacking model (where the older version corresponds to a previous training iteration). In addition, in various embodiments, the given iteration may also comprise obtaining, from the new version of the stacking model, respective proposed labels corresponding to individual records of the batch $B_u$. Furthermore, the iteration may also include generating, using the records of the batch $B_u$ and the proposed labels, respective new versions of one or more base models from older versions of the one or more base models corresponding to the previous training iteration in such embodiments. Input provided to the older versions of the base models to generate the new versions may not include records of the labeled subset 145 of the data set in the depicted embodiment. In effect, the unlabeled portions of the data set may be used to train or update the base models, while the labeled portions of the data set may be used to train or update the stacking model. This use of disjoint portions of input data for training may help present overfitting in various embodiments.

After the termination criterion is met, a final trained ensemble of models (selected from a particular training iteration, usually although not necessarily the final iteration) including the stacking model and at least one base model may be stored, for example at trained models repository 130. The termination criterion may comprise, for example, determining that the prediction quality of the ensemble of models has reached a desired level, that the delta in prediction quality improvement between iterations has fallen below a threshold, that all the unlabeled data has been utilized, and/or that a target budget of resources or time set aside for the training has been exhausted in different embodiments. In some embodiments, results such as values of target variables obtained from the final trained ensemble for new data records (i.e., records which were not used during training) may be provided to one or more downstream programs 151, at which automated actions may be initiated in response to the results, and/or the results may be provided via the programmatic interfaces 177 to clients of the analytics service.

Example Use of Stacking when Large Training Data Sets are Available

It may be helpful, before describing additional details of the proposed iterative stacking techniques, to present some baseline information about stacking-based combination of machine learning models. The term "model ensemble" is used to describe a combination of several different models being used in concert to address a given machine learning task. Preparing such ensembles may help improve the overall quality of predictions obtained for various types of machine learning tasks relative to using a single model, e.g., by reducing bias and/or variance. Several different types of ensemble-based techniques have been proposed, including bagging (bootstrap aggregation of models), boosting, and stacking. In the stacking approach, a meta-model referred to as a stacking model is trained to combine predictions from a set of based models. Stacking techniques have often performed well in machine learning competitions.

Figure 2:
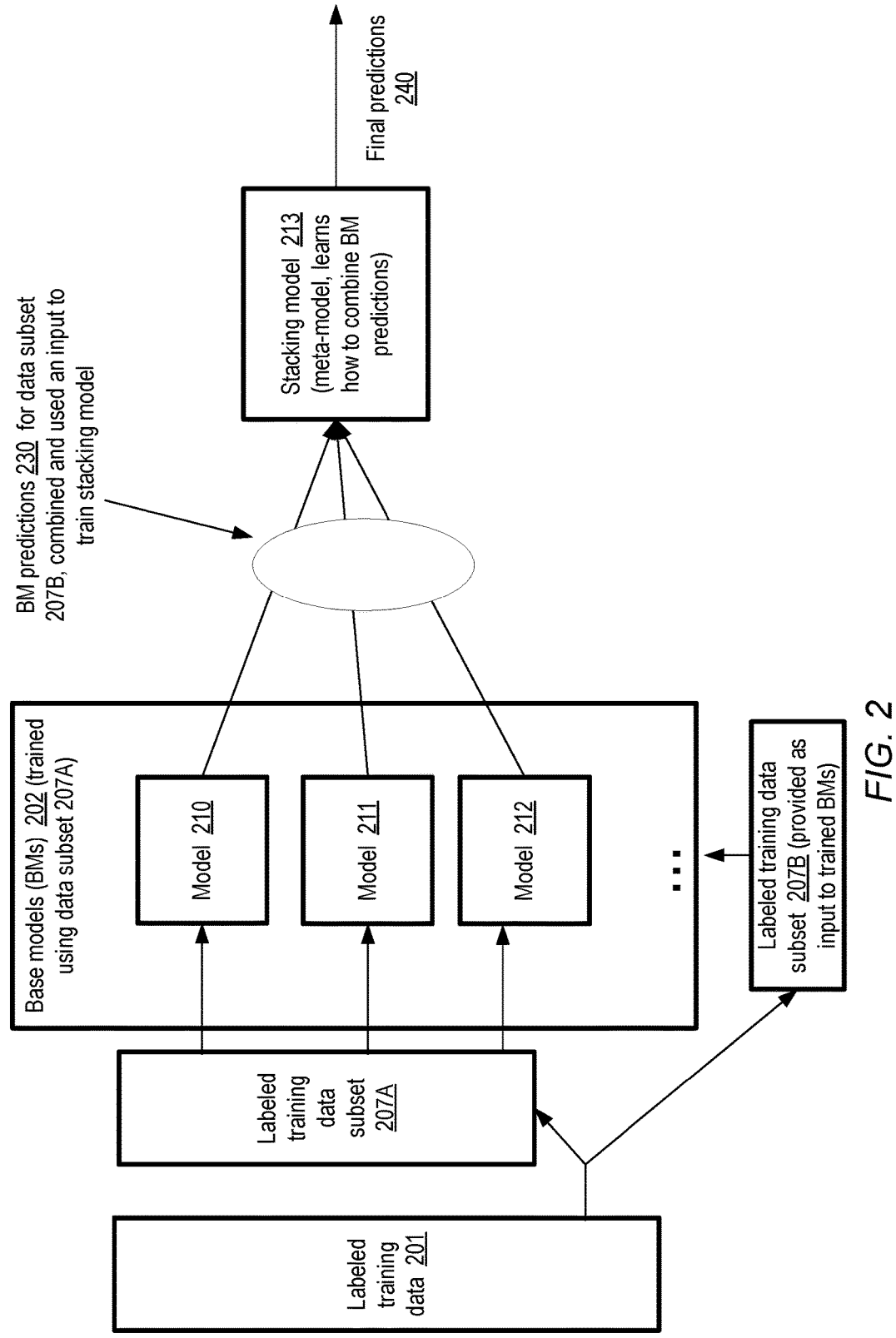
FIG. 2 illustrates the use of a model ensemble preparation methodology in a scenario in which a large amount of labeled training data is available for a machine learning task, according to at least some embodiments.

FIG. 2 illustrates the use of a model ensemble preparation methodology in a scenario in which a large amount of labeled training data is available for a machine learning task, according to at least some embodiments. Depending on the machine learning algorithms being implemented (e.g., as base models) in the ensemble, each of the constituent models of the ensemble may need a substantial amount of labeled data for training. For example, deep neural network-based models, which often require the learning of large numbers (e.g., thousands) of parameters, tend to need large amounts of training data.

If a sufficient amount of labeled training data 201 is available (where the definition of "sufficient" may vary from one problem domain and ensemble to another) as in Scenario A shown in FIG. 2, the labeled training data may be split up into two subsets 207A and 207B. The set of base models (BM) 202 (such as models 210, 211 and 212) may be trained using a first subset 207A. The remaining labeled training data subset 207B may be provided as input to the BMs 202, and the predictions 230 generated for the data subset 207B by the BMs may be used (along with the actual labels of subset 207B) as input to train the stacking model 213. The stacking model 213 may be considered a meta-model which learns how best to combine the predictions of the BMs 202 in the scenario depicted in FIG. 2. The output of the stacking model 213 may comprise the final predictions 240 of the ensemble in the depicted embodiment.

Overview of Example Iterative Stacking Technique

Figure 3:
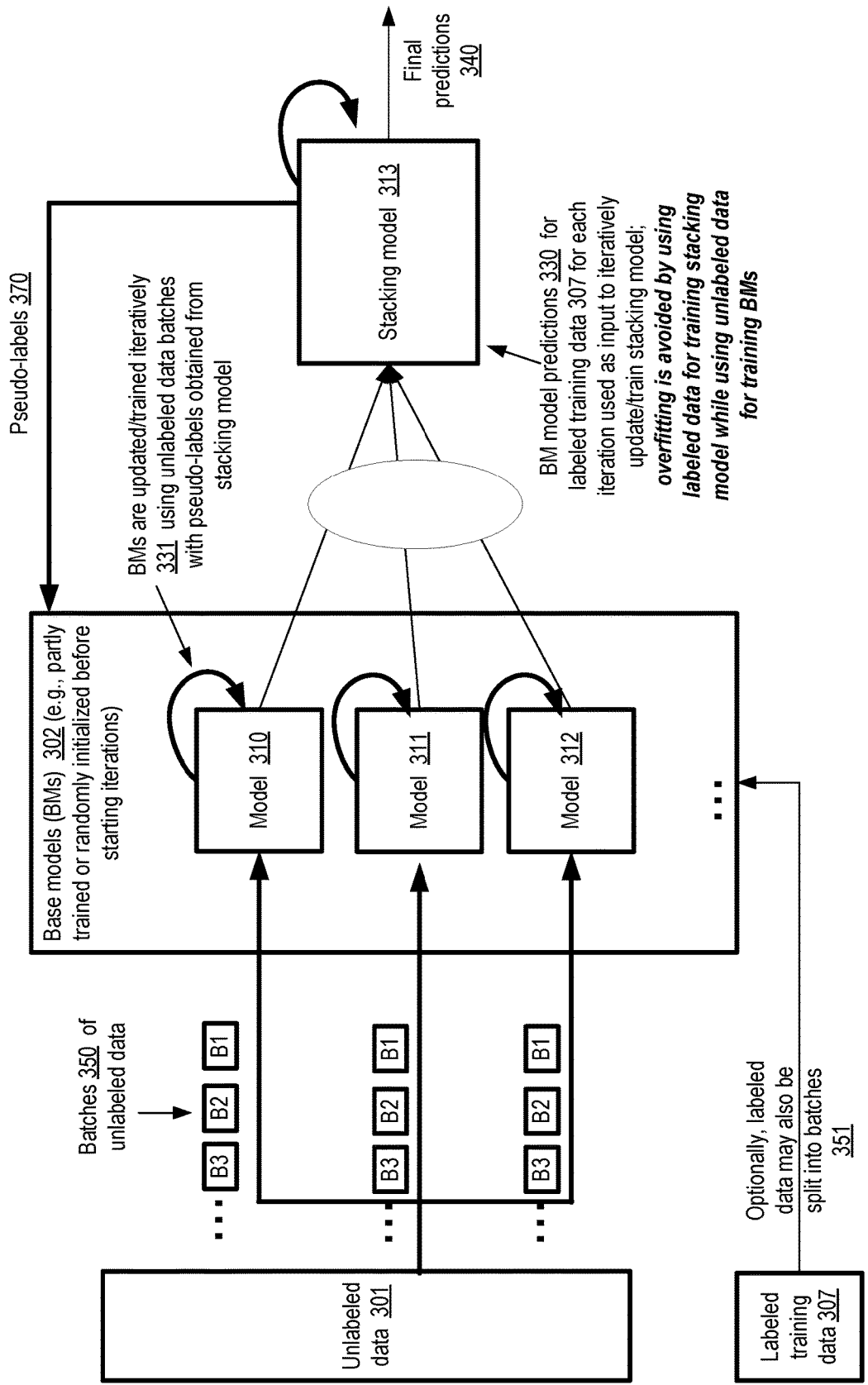
FIG. 3 illustrates an overview of an example iterative stacking based training technique usable in scenarios with relatively small amounts of labeled data, in which unlabeled data is used to train a collection of base models and the labeled data is used to train a stacking model, according to at least some embodiments.

FIG. 3 illustrates an overview of an example iterative stacking based training technique usable in scenarios with relatively small amounts of labeled data, in which unlabeled data is used to train a collection of base models and the labeled data is used to train a stacking model, according to at least some embodiments. In contrast to scenario A of FIG. 2, the amount of labeled data 307 in Scenario B shown in FIG. 3 is insufficient to train a set of base models (BMs) 302 as well as a stacking model 312 in the depicted embodiment.

In many real-world situations, the number of records of unlabeled data 301 available may be much greater than the number of records of labeled data 307 available.

In an initialization step of the iterative training procedure, the number and types of a collection of base models 302 (e.g., models 310, 311 and 312) and stacking model 313 to be used may be identified and partly trained or randomly initialized in various embodiments. The partial training may, for example, be accomplished using a stock set of labeled data available in the public domain, such as labeled image sets, labeled text documents and the like, depending on the kind of machine learning task which is to be performed.

The unlabeled data 301 may be divided into batches 350, such as batches B1, B2 and B3, and each batch may be used in a respective iteration of the training. Within a given iteration, at least some of the labeled training data 307 may be used to update or train the stacking model 313 in the depicted embodiment; that is, a new version of the stacking model may be obtained using the labeled training data. In some implementations, the labeled data may also be split into batches as indicated by label 351, with one or more batches being used per iteration; in other implementations, the entire set of labeled data may be used for each iteration. The labeled training data (with the labels removed) may be provided as input to the current versions of the BMs 302, and the output predictions 330 of the BMs may be provided (along with the labels that were previously removed) as input to update the stacking model 313. In at least some embodiments, in addition to the predictions generated by the BMs, the training input to the stacking model 313 may include additional features generated or derived from the attributes of the labeled data, which may also be helpful in characterizing the input records. For example, in a scenario in which the machine learning task involves the analysis of text input records, such features may include the number of text tokens in the record, the number of characters, the length of the longest token, and so on.

A given batch of unlabeled data (which has not been used for a previous iteration) along with a corresponding proposed set of labels (also referred to as pseudo-labels 370) obtained for that batch from the updated version of the stacking model 313 may be used to update (perform the next iteration of training of) each of the different BMs 310 in the depicted embodiment, as indicated by label 331. As such, the training input to the BMs 302 may comprise unlabeled data (along with pseudo-labels or proposed labels obtained from the stacking model), while the training input to the stacking model may comprise the labeled data, so that the sets of training data for the two different kinds of models do not overlap. As a result of the non-overlapping training inputs, as indicated earlier, overfitting of any of the models of the ensemble comprising based models 302 and stacking model 313 as a whole may be avoided in the depicted embodiment. After all the models of the ensemble have been trained, the final prediction 340 for a given input record may be obtained using the combination of the base models and the stacking model.

Example Factors Influencing Selection of Iterative Stacking-Based Strategy

Figure 4:
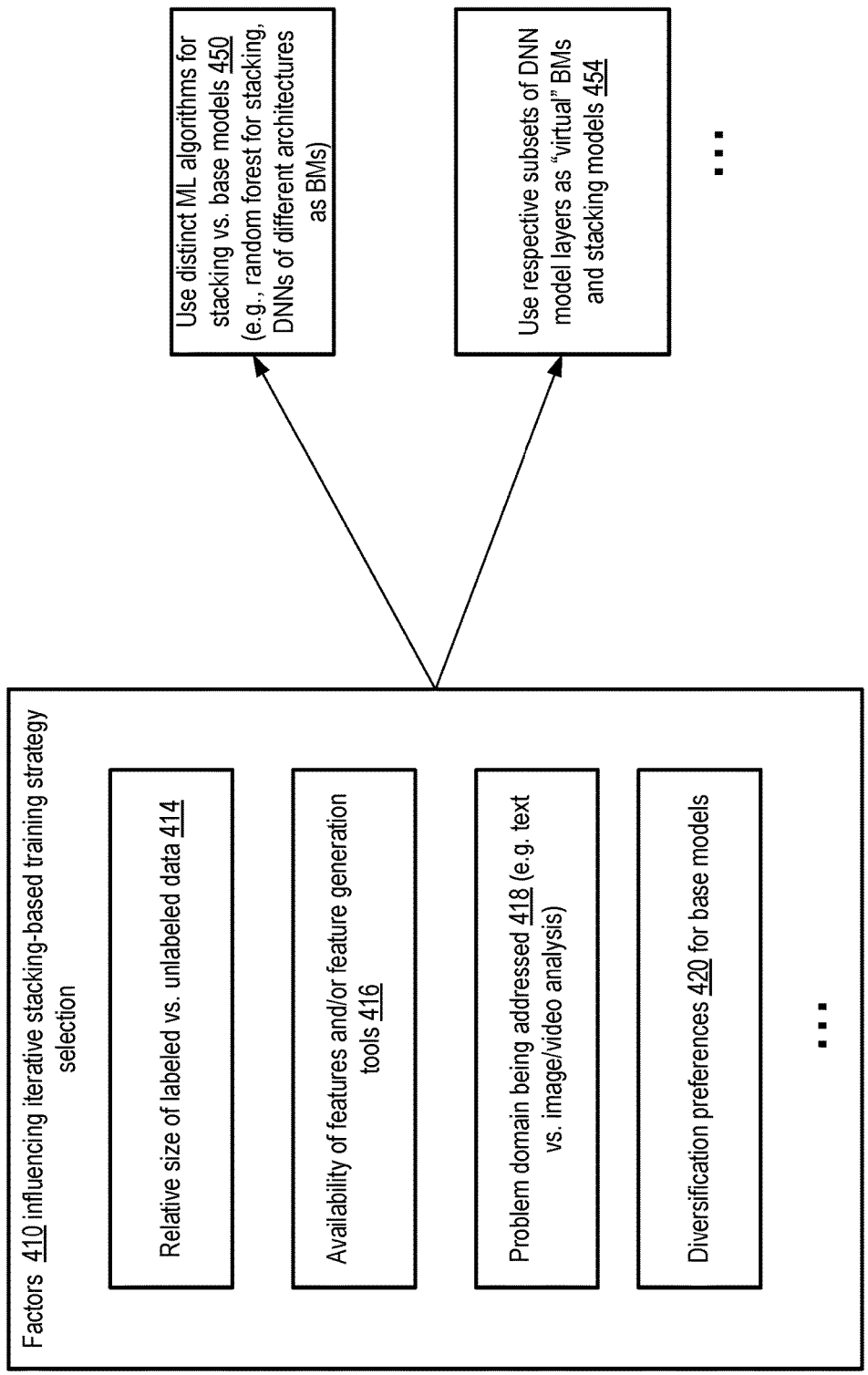
FIG. 4 illustrates example factors which may be used to select a particular iterative stacking based training strategy, according to at least some embodiments.

As mentioned above, several different iterative stacking based strategies, different from one another in the kinds of stacking and base models used, may be supported in some embodiments at an analytics service similar to service 102 of FIG. 1. FIG. 4 illustrates example factors which may be used to select a particular iterative stacking based training strategy, according to at least some embodiments.

In the embodiment shown in FIG. 4, factors 410 influencing the selection of a strategy may include the relative size of labeled versus unlabeled data 414, the availability of features and/or feature generation tools 416, the problem domain being addressed 418 (e.g., text vs. image/video analysis), and/or diversification preferences 420 for base models. Based on one or more of the factors, a decision may be made to select a strategy which comprises using distinct machine learning algorithms for stacking versus the base models 450, a strategy which comprises using respective subsets of layers of the same DNN model as "virtual" base models and stacking models 454, or other strategies in some embodiments.

The amount of labeled data available (e.g., as a ratio with respect to the amount of unlabeled data, or on an absolute level) may impact the selection of the training strategy in the following way in at least some embodiments. If only a very small amount of labeled data is available, using a neural network (or even a subset of layers of a neural network) as the stacking model may not be preferred, as the neural network based stacking model would be prone to overfitting if it is trained using such limited labeled data. Instead, an algorithm such as random forest (RF) may be preferable for the stacking model. The complexity of individual decision trees of the RF may be restricted by fixing hyper-parameters such as the maximum depths of the trees to reduce the probability of overfitting, for example. In contrast, when the size of the total data set is large and the fraction of labeled data is not vary small, a split-DNN strategy similar to that discussed below in the context of FIG. 6 and FIG. 7 may be preferred, as the size of the labeled data set may be sufficient to learn the parameters of the neural network layers used for the virtual stacking model.

If a large number of features relevant to the problem domain being addressed are provided for the input data (e.g., by a client on whose behalf the models are to be trained), or automated tools/programs that can be used to generate such features are available/provided, this may also favor the use of RF or other non-DNN models as the stacking models in various embodiments. Feature generation tools 416 may, for example, include statistical text analysis tools and the like for natural language processing tasks. In one example scenario, the task to be performed using the model ensemble may comprise predicting the rating (e.g., the number of stars on a scale of 1 to 5) likely to be assigned to a given product, based on analysis of user-generated text comments or reviews on the product. Useful features generated for such a task from the raw text comments may include, among others, (a) the number of positive words/phrases in the review, based on a dictionary of positive words/phrases, automatically detected using regular expressions, (b) the number of negative words/phrases in the review, based on a dictionary of negative words/phrases, also detected using regular expressions, (c) the ratio of the counts of such positive versus negative terms, (d) the count of angry or abusive words, (e) the number (if any) of stars mentioned in the text portion of the reviews, (f) the total number of text tokens in the reviews/comments, (g) the number of characters in the reviews/comments, (h) the length of the longest token, (i) an indication as to whether the text is all in upper case or uses a mix of cases, (j) the ratio of the number of punctuation symbols to the total length of the review/comment, and/or (k) whether the text contains repeated punctuation symbols (such as "! ! !". If tools to extract many such features are available, the use of tree-based algorithms such as RF may be preferred, as the decisions made at the tree nodes can be more easily expressed using such features in various embodiments. If only a few such features or feature extraction tools are available, RF and similar algorithms may not work quite as well.

Some iterative-stacking based strategies may work better for particular machine learning problem domains 418 than others in various embodiments. For example, it may be the case that in general, the use of RF may work better for text analysis than for image/video analysis. In at least one embodiment, records indicating the extent of the success achieved with respect to different problem domains by different strategies may be stored in a knowledge base of an analytics service (similar to knowledge base 128 of FIG. 1) and used to help select the appropriate strategy for a new instance of a machine learning task.

In at least some embodiments, a client on whose behalf a machine learning task is to be performed may provide a programmatic indication of diversification preferences 420 with respect to the set of base models to be used. For example, the client may indicate that DNN models with different internal architectures (e.g., convolution models versus LSTM based models) are preferred. In such cases, the split-DNN strategy may not be usable, as it involves the use of a single DNN (split into parts that are used as virtual base models and another part that is used as the stacking model as discussed below). Several of the factors shown in FIG. 4 may be utilized in some embodiments to select the iterative training strategy for a particular machine learning task. Factors other than those shown in FIG. 4 may be used in some embodiments to select strategies.

Methods for Iterative-Stacking Based Training of Models

Figure 5:
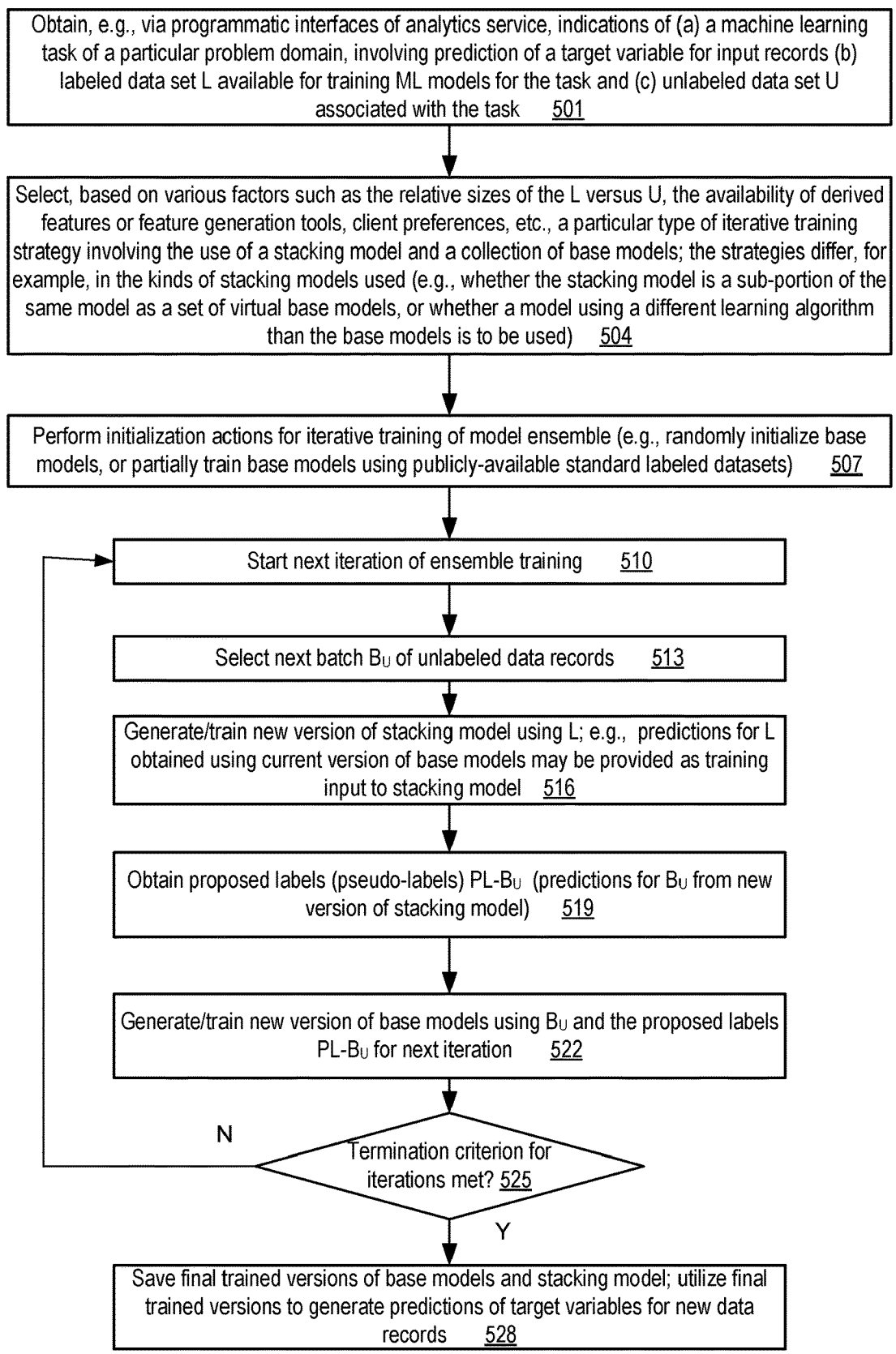
FIG. 5 is a flow diagram illustrating aspects of operations that may be performed to implement iterative training of a collection of base models and a stacking model, according to at least some embodiments.

FIG. 5 is a flow diagram illustrating aspects of operations that may be performed to implement iterative training of a collection of base models and a stacking model, according to at least some embodiments. As shown in element 501, respective indications of (a) a machine learning task of a particular problem domain, involving the prediction of one or more target variables for input records, (b) a labeled data set L available for training machine learning models for the task and (c) an unlabeled data set U associated with the task may be obtained, e.g., via one or more programmatic interfaces of an analytics service similar in functionality to analytics service 102 of FIG. 1.

Based on some combination of factors (similar to those discussed in the context of FIG. 4) such as the relative sizes of L versus U, the availability of derived features or tools to automatically generate such features, preferences indicated programmatically by the client on whose behalf the task is to be performed, etc., a particular type of iterative training strategy involving the use of a stacking model and a collection of base models may be selected (element 504) for the machine learning task in the depicted embodiment. The strategies may differ, for example, in the kinds of stacking models used, the combinations of base models used, etc. One strategy may involve using a stacking model which is a sub-portion of the same model as respective virtual base models, another may involve using a different learning algorithm for the stacking model than is used for the base models, and so on.

A set of initialization actions may be performed for the iterative training of a model ensemble identified according to the selected strategy (element 507) in various embodiments. For example, the base models may be randomly initialized, or partially trained using publicly-available or standard labeled data sets which may not overlap with L.

One or more iterations of ensemble training may then be initiated (element 510). For a given iteration, the next batch $B_U$ of unlabeled data records may be selected from U (element 513). In at least some embodiments, the batches for the different training iterations may not overlap with one another. A new version of the stacking model may be trained or generated using at least a portion of the labeled data set L; for example predictions for L, generated using for the labeled data using current versions of the base models, may be provided as training input to the stacking model along with the labels of L (element 516).

A set of proposed labels or pseudo labels PL-$B_U$ for unlabeled data $B_U$ may be generated using the updated version of the stacking model in various embodiments (element 519). Then, respective new versions of the base models may be trained or generated using $B_U$ and PL-$B_U$ for the next iteration of the training procedure (element 522). Thus, both types of models (the base models and the stacking model) of the ensemble may be updated or trained in each iteration using disjoint sets of training data for the two types of models.

If the criteria for terminating the iterations is satisfied (as determined in operations corresponding to element 525), the final trained versions of the base models and stacking models may be stored (element 528), e.g., at a repository of trained models of the analytics service. A termination criterion may comprise, for example, determining that the prediction quality of the ensemble of models has reached a desired level, that the delta in prediction quality improvement between iterations has fallen below a threshold, that all the unlabeled data has been utilized in the different batches, and/or that a target budget of resources or time set aside for the training has been exhausted in different embodiments. If the termination criteria have not been met, the next iteration may be conducted, e.g., by performing additional operations corresponding to elements 510 onwards in at least some embodiments. The final trained versions of the ensemble models may be executed as needed to generate predictions of target variables for new data records in various embodiments.

Example Split-DNN Technique

Figure 6:
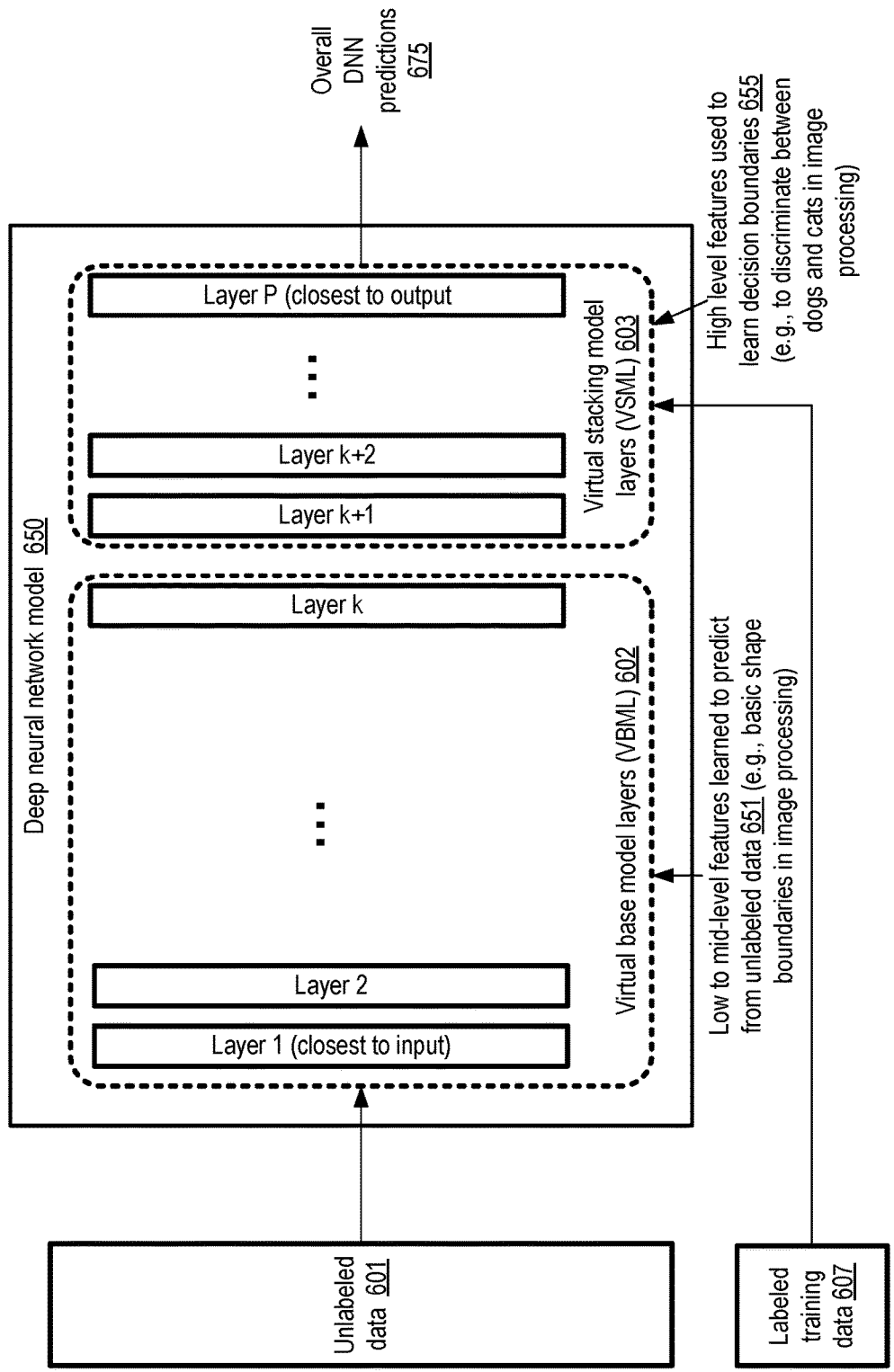
FIG. 6 illustrates an example semi-supervised learning technique involving the splitting of a deep neural network model into virtual base models and a virtual stacking model, according to at least some embodiments.

FIG. 6 illustrates an example semi-supervised learning technique involving the splitting of a deep neural network model into virtual base models and a virtual stacking model, according to at least some embodiments. Deep neural network (DNN) model 650 may comprise numerous internal layers, designated as layers 1 through P in the depicted embodiment. Input to the DNN model 650 may be processed from left to right in the scenario depicted in FIG. 6—that is, among layers 1 through P, layer 1 may be closest to the input, while layer P may be closest to the output (the overall DNN predictions 675). In some implementations, depending on the kind of DNN being used, Layer 1 may represent the input layer and Layer P may represent the output layer, in that input records may be sent to Layer 1, and output predictions may be obtained from Layer P. In other embodiments, there may be other model layers (e.g., layers in which vector embeddings are learned) between the raw input and Layer 1, or between Layer P and a portion of the model at which the overall DNN predictions are generated.

In the embodiment depicted in FIG. 6, a group of layers (e.g., layers 1 through k) closer to the input end of the DNN may be used as the equivalent of base models, and referred to as virtual base model layers (VBML) 602, while the remaining layers (layers (k+1) through P) may be utilized as the equivalent of a stacking model and referred to as a virtual stacking model layers (VSML) 603. As such, the technique illustrated in FIG. 6 may be referred to as a split-DNN algorithm. The term "virtual" may be applied to the base models and the stacking models in the split-DNN approach as each of these two types of model is not a full-fledged or standalone model, but nevertheless is used in a similar way in the training iterations as such standalone models are used in the iterative stacking approach discussed in the context of FIG. 3 and FIG. 5. This type of strategy may be adopted, for example, in scenarios in which (a) a single deep learning model is selected for the machine learning task at hand) and (b) there is sufficient labeled training data 607 (relative to unlabeled data 601) for learning parameters of the VSML in some embodiments.

Labeled training data 607 and unlabeled data 601 for a given machine learning task may both be subdivided into batches for an iterative training procedure in the depicted embodiment. During a given training iteration involving a batch BL of labeled data and a batch $B_U$ of unlabeled data, the following operations may be performed. Using BL and its labels, the parameters of the VSML such as various weights may be updated, e.g., using cross-entropy loss with dropout. Proposed labels or pseudo-labels may then be obtained for $B_U$ using the updated version of VSML, e.g., by providing $B_U$ as input to the VBML and passing the output of the VBML through the VSML. In at least some embodiments, such proposed labels may be obtained without dropout. Then, using $B_U$ and its proposed labels, VBML may in turn be updated, e.g., using cross-entropy loss with dropout.

In various embodiments, low to mid-level features of the input data may be learned at the VBML 602, as indicated by label 651, while high-level features may be used to learn decision boundaries at the VSML 603, as indicated by label 655. For example, in an image processing application which is to be used to identify the type of animal shown in an input image, basic shape boundaries and edges may be detected in the VBML, while the categorization of the animals into cats, dogs, etc., may be performed in the VSML.

Figure 7:
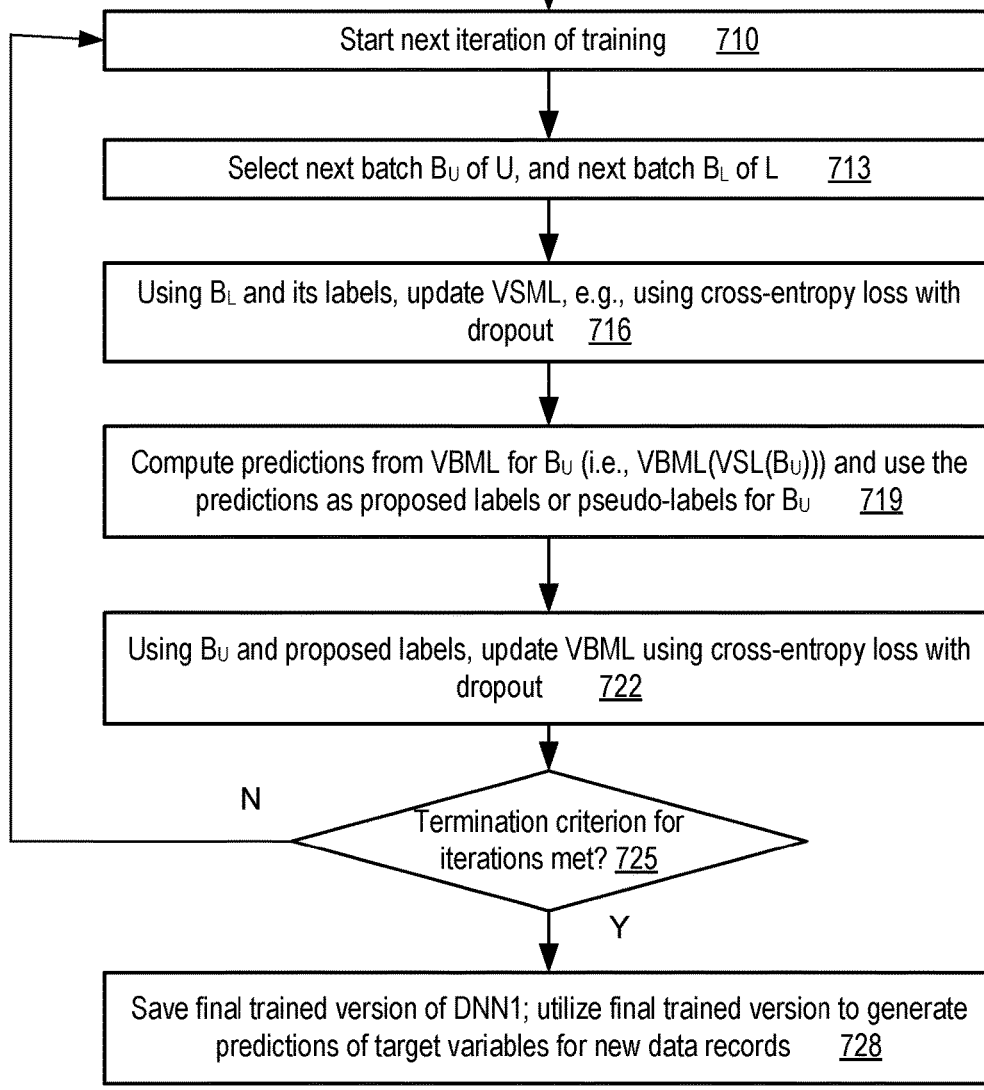
FIG. 7 is a flow diagram illustrating aspects of operations that may be performed to implement a neural network split based semi-supervised learning technique, according to at least some embodiments.

FIG. 7 is a flow diagram illustrating aspects of operations that may be performed to implement a neural network split based semi-supervised learning technique, according to at least some embodiments. As shown in element 701, a determination may be made that a split-DNN methodology similar to that discussed above is to be used for a machine learning task with a labeled data set L and an unlabeled dataset U available for a deep learning model DNN1. DNN1 may comprise a plurality of layers of artificial neurons.

The layers of DNN1 may be split into two contiguous groups in the depicted embodiment: virtual base model layers (VBML) and virtual stacking model layers (VSML) (element 704). VBML may be closer to the input side of DNN1 than VSML, and VSML may be closer to the output side of DNN1 in various embodiments—that is, in the feedforward sequence of operations from the input to the output, VBML may be encountered before VSML.

The next iteration of training the ensemble comprising VBML and VSML may be initiated (element 710). A batch of records $B_U$ may be identified from the unlabeled data U for the current iteration, and a batch of records BL for the current iteration may be identified from the labeled data L (element 713). Using BL and its labels, the VSML may be updated, e.g., using cross-entropy loss with dropout in some embodiments (element 716).

Using the updated version of VSML, predictions for $B_U$ (e.g., VBML(VSL($B_U$))) may be generated and designated as pseudo-labels or proposed labels for $B_U$ (element 719) in the depicted embodiment. Then, using $B_U$ and the proposed labels, the VBML may itself be updated, e.g., using cross-entropy loss with dropout in at least some embodiments (element 722).

If the termination criteria for the training iterations (which may be similar to the termination criteria discussed earlier) are satisfied, as determined in operations corresponding to element 725, a final trained version of DNN1 may be stored in various embodiments (element 728). The final trained version may be used to generate predictions of target variables for new data records which were not used during the training iterations. If the termination criteria are not satisfied, e.g., if more unlabeled or labeled data remains and DNN1 has not yet reached a desired prediction quality level, operations corresponding to elements 710 onwards may be performed for the next iteration.

It is noted that in various embodiments, some of the operations shown in the flow diagrams of FIG. 5 and/or FIG. 7 may be implemented in a different order than that shown in the figure, or may be performed in parallel rather than sequentially. Additionally, some of the operations shown in FIG. 5 and/or FIG. 7 may not be required in one or more implementations.

Example Programmatic Interactions

Figure 8:
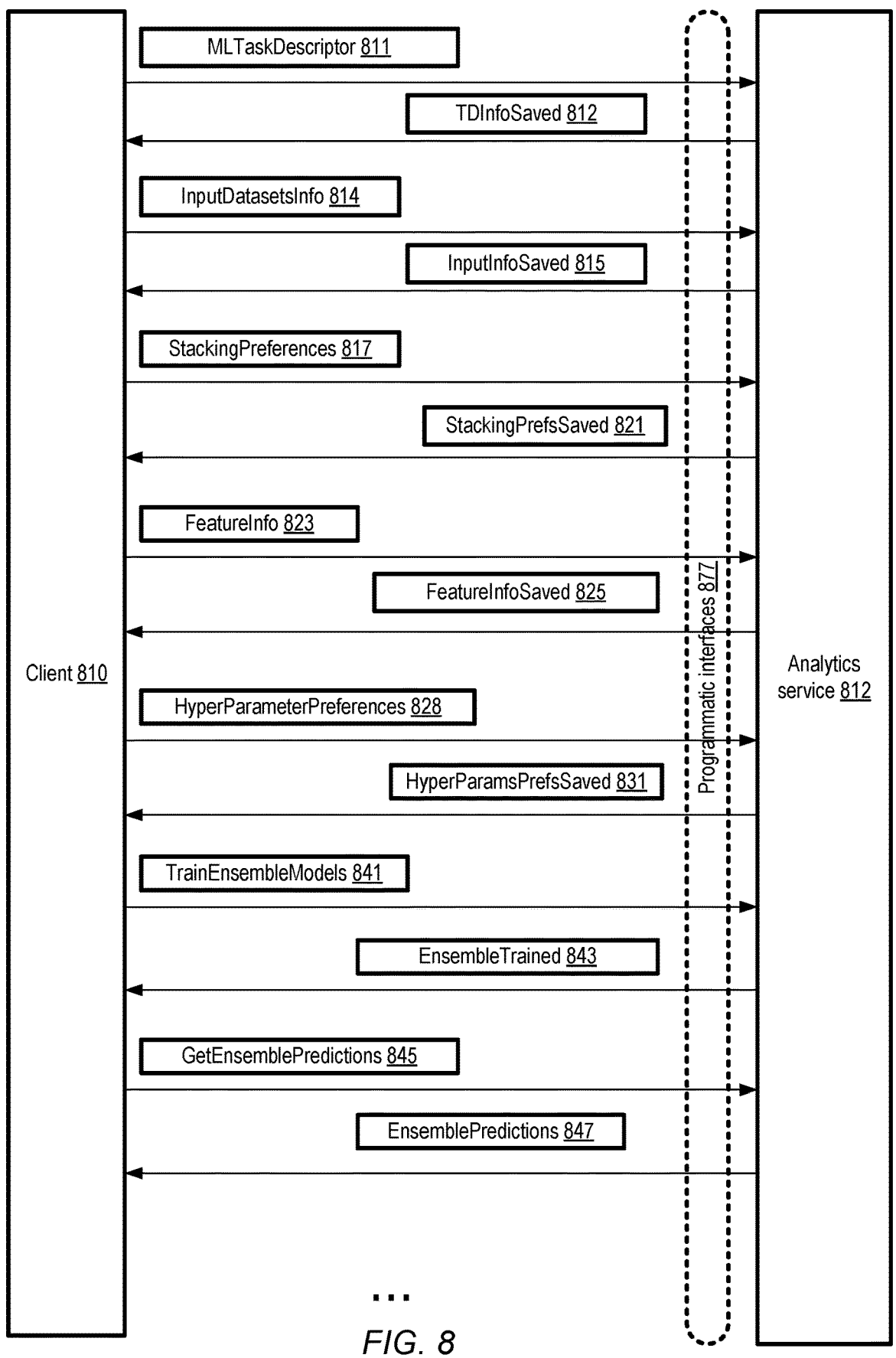
FIG. 8 illustrates example programmatic interactions pertaining to content presentation impact estimation, according to at least some embodiments.

FIG. 8 illustrates example programmatic interactions pertaining to content presentation impact estimation, according to at least some embodiments. An analytics service 812, similar in features and functionality to analytics service 102 of FIG. 1, may implement one or more programmatic interfaces 877 in the depicted embodiment, such as a web-based console, command-line tools, graphical user interfaces, application programming interfaces (APIs) and the like.

Programmatic interfaces 877 may be utilized by clients 810 to submit messages comprising requests and preferences pertaining to the training and execution of machine learning models for various tasks, and to receive corresponding responses. In some embodiments, for example, a client 810 may submit an MLTaskDescriptor request 811, indicating the problem domain for which one or more models are to be trained, the target variables to be predicted for the task based on the analysis of the attributes of input records, and so on. The provided task information may be stored at a repository of the analytics service, and a TDInfoSaved message may be sent to the client 810 as an acknowledgement in the depicted embodiment.

An indication of the input data available for training the model(s) may be provided by a client in one or more InputDataSetsInfo messages 814 in the depicted embodiment. For example, if the labeled data set is available at a first storage location, and the unlabeled data set is available at a second storage location, information about the first and second storage locations (e.g., universal resource identifiers or URIs), including credentials needed (if any) may be provided in an InputDataSetsInfo message 814. The provided information may be stored at the analytics service 812 and an InputInfoSaved message 815 may be sent to the client.

In at least one embodiment, a client 810 may provide an indication of the stacking approach or strategy to be employed (e.g., whether a split-DNN approach is to be used or not) or indicate factors to be used to select stacking and base models in a StackingPreferences message 817. After the preferences are stored, the StackingPrefsSaved response message 821 may be sent to the client in some embodiments. In some embodiments, the StackingPreferences message may specify the types of models to be used as base models and stacking models. In A FeatureInfo message 823 may be used, for example, to indicate tools or algorithms which can be used to extract or derive features from the raw input records of the labeled and/or unlabeled data sets in some embodiments. A FeatureInfoSaved message 825 may be sent to the client after the feature information is saved. In at least one embodiment, a client may provide values of various derived features for the records of at least a portion of the labeled or unlabeled data, instead of or in addition to providing an indication of automated tools which can be used to generate the features.

In some embodiments, a client 810 may provide preferred values of one or more hyper-parameters of the models to be used as base models or as stacking models, e.g., using one or more HyperParametersPreferences messages 828. The hyper-parameters for which preferred values are indicated may include, for example, the dimensions or sizes of various layers of neural network-based models, loss functions to be used during training, training iteration termination criteria, and so on. After the preferred hyper-parameter values are stored, a HyperParamsPrefsSaved message 831 may be sent to the client from the analytics service in some embodiments.

To initiate training iterations of the kind discussed above, a TrainEnsembleModels request 841 may be submitted in some embodiments. In response, the requested training iterations may be implemented at the analytics service 812. After the training iterations are terminated, an EnsembleTrained message 843 may be sent to the client 810 in some embodiments.

A client 810 may submit a GetEnsemblePredictions request 845, indicating one or more records for which predictions of target variables are desired using the trained combination of base models and stacking models generated for the machine learning task in the depicted embodiment. In response, the trained versions may be executed, and the predictions produced by the trained versions may be provided to the client in one or more EnsemblePredictions messages 847.

In at least one embodiment, combinations of programmatic interactions other than those shown in FIG. 8 may be supported for iterative stacking-based training of ensemble models. For example, in some embodiments a client 810 may not necessarily provide guidance about model hyper-parameters; instead, the analytics service may choose the model hyper-parameters on behalf of the client. In at least one embodiment, some of the types of programmatic interactions shown in FIG. 8 may not be supported.

Example Provider Network Environment

Figure 9:
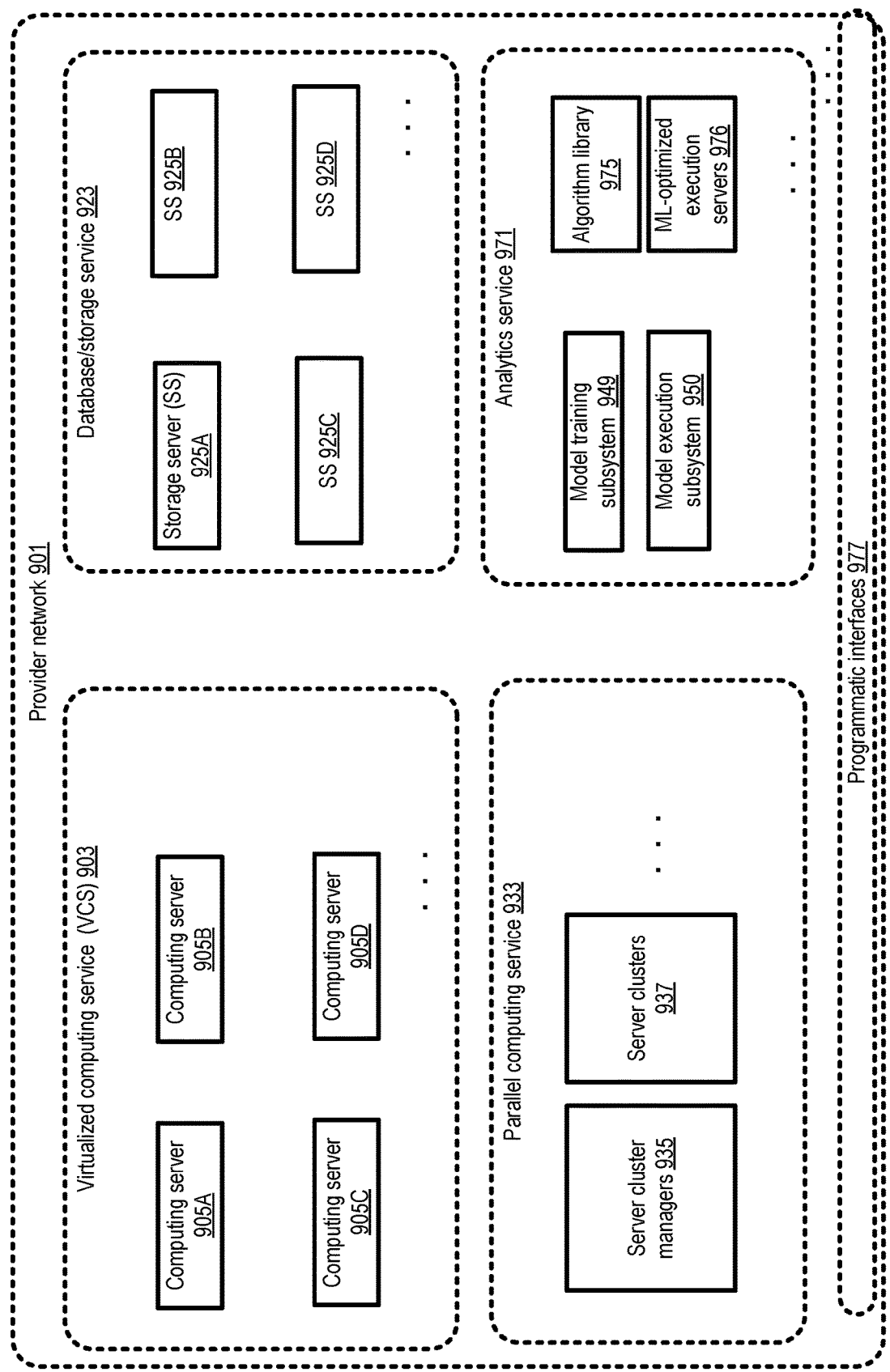
FIG. 9 illustrates an example provider network environment in which an analytics service supporting iterative stacking based semi-supervised learning may be implemented, according to at least some embodiments.

In some embodiments, as mentioned earlier, an analytics service at which iterative stacking-based model training techniques similar to those described above are supported may be implemented at a provider network. FIG. 9 illustrates an example provider network environment in which an analytics service supporting iterative stacking based semi-supervised learning may be implemented, according to at least some embodiments. In the depicted embodiment, provider network 901 may comprise resources used to implement a plurality of services, including for example a virtualized computing service (VCS) 903, a database/storage service 923, and a parallel computing service 933 as well as an analytics service 971 within which iterative stacking-based model ensemble may be trained and run. The analytics service 971, which may also be referred to as a machine learning service or an artificial intelligence service, in turn may comprise algorithm library 975, model training subsystem 949 at which various types of base models and stacking models may be trained and re-trained using algorithms from library 975, model execution subsystem 950 at which the models are executed, and machine learning-optimized execution servers 976 in the depicted embodiment. The parallel computing service 933 may include various server clusters 937, each comprising a plurality of servers, on which parallelizable workloads may be distributed by a set of server cluster managers 935 in the depicted embodiment. Some of the algorithms implemented at the analytics service 971 may be parallelizable, and may utilize the server clusters 937 in at least some embodiments.

Components of a given service may utilize components of other services in the depicted embodiment—e.g., for some analytics service tasks, virtual machines implemented at computing servers such as 905A-905D of the virtualized computing service 903 may be used, server clusters 937 and/or cluster managers 935 may be utilized for parallelizable computations of the analytics service, input data and/or output produced at the analytics service may be stored at storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment.

In some embodiments, at least some aspects of the iterative stacking techniques described herein may be implemented without acquiring resources of network-accessible services such as those shown in FIG. 9. For example, a standalone tool implemented at one or more computing devices which are not part of a network-accessible service may be used in one embodiment.

Use Cases

The techniques described above, of iteratively training model ensembles comprising a set of base models and a stacking model in a semi-supervised manner may be extremely beneficial in a variety of scenarios. Many machine learning problems are best addressed using very large neural network models, often with numerous internal layers and thousands of parameters to be learned. In order to train such models to produce predictions of acceptable quality, very large amounts of labeled data may be required if fully-supervises training is employed. In the proposed semi-supervised methodology, instead of expending resources on labeling all the records available, proposed labels are generated for batches of unlabeled data using a stacking model which is itself trained using a small amount of available labeled data. The proposed labels can then be used to train a group of based models, whose predictions are combined in the input of the stacking model. By using disjoint sets of records as training input (with labeled records being used to train the stacking model, and unlabeled data with associated proposed labels being used to train the base models), the probability of overfitting the ensemble of models may be reduced substantially, leading to higher quality of predictions overall.

Illustrative Computer System

Figure 10:
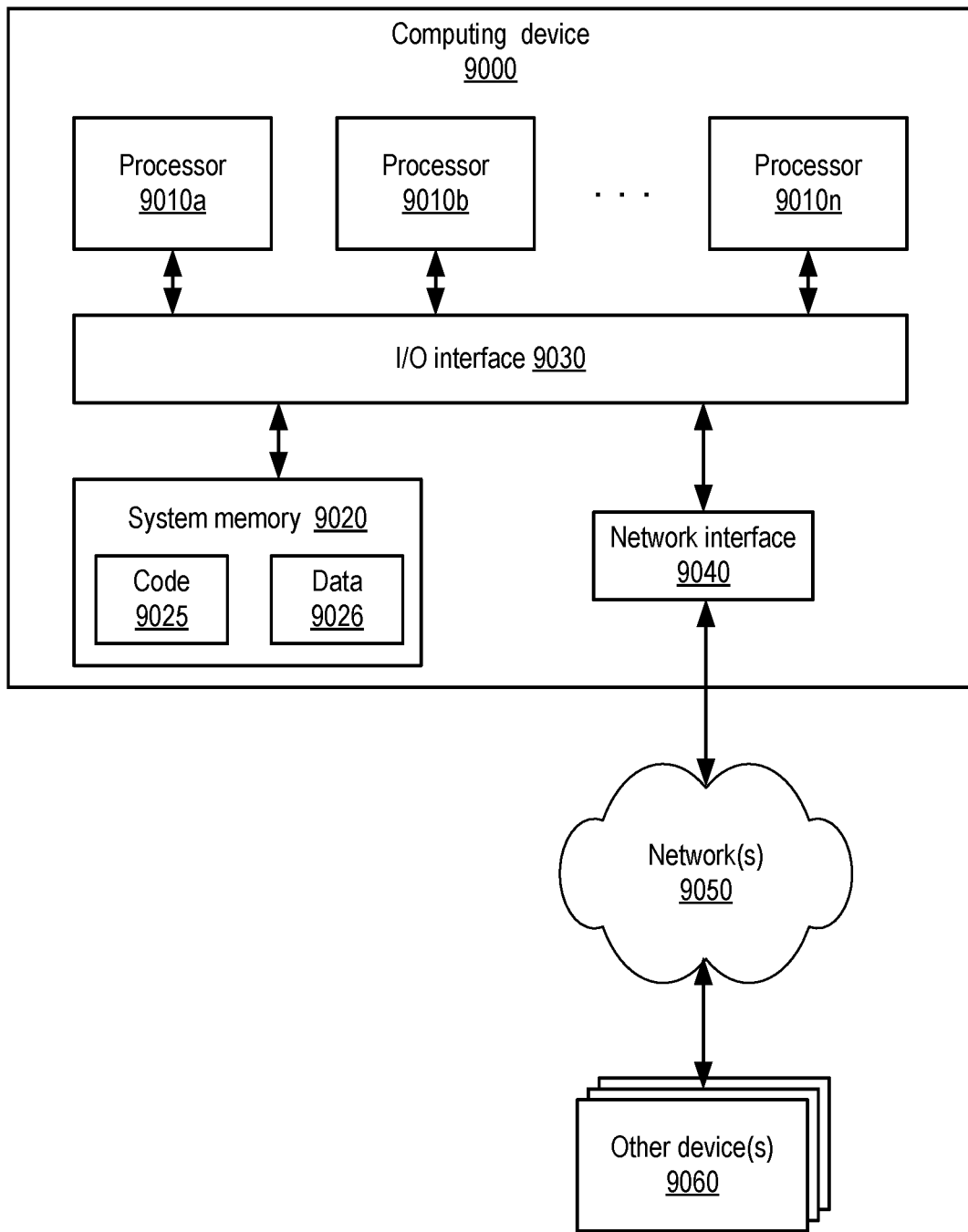
FIG. 10 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
obtain an indication of a machine learning task which includes prediction of at least a first target variable corresponding to respective input records;
select a first iterative training strategy to be used for the machine learning task from a plurality of iterative training strategies, based at least in part on (a) respective sizes of labeled and unlabeled data sets available for training one or more models for the machine learning task and (b) an indication of availability of one or more derived features corresponding to individual ones of the records of the labeled data set, wherein a particular iterative training strategy of the plurality of iterative training strategies differs from another iterative training strategy of the plurality of iterative training strategies in a type of machine learning model utilized for stacking;
implement a plurality of training iterations of the first iterative training strategy until an iteration termination criterion is met, wherein a particular training iteration comprises:
selecting a batch of unlabeled records from the unlabeled data set;
generating, using at least a portion of the labeled data set, a first version of a stacking model from a second version of the stacking model, wherein the second version corresponds to a previous training iteration;
obtaining, from the first version of the stacking model, respective proposed labels corresponding to individual records of the batch of unlabeled records; and
generating, using the records of the batch and the respective proposed labels, respective first versions of one or more base models from second versions of the one or more base models corresponding to the previous training iteration, wherein input provided to the second versions of the one or more base models to generate their respective first versions does not include records of the labeled data set;
store, after the iteration termination criterion is met, a final trained ensemble of models including the stacking model and at least one base model, wherein the final trained ensemble of models is obtained from a selected iteration of the plurality of training iterations; and
obtain, using at least a portion of the final trained ensemble of models, a predicted value of the first target variable corresponding to an input record which was not in the unlabeled data set.

2. The system as recited in claim 1, wherein the stacking model comprises a random forest model.

3. The system as recited in claim 1, wherein the stacking model (a) comprises a first subset of layers of a neural network-based model and (b) does not include at least a second subset of layers of the neural network-based model, and wherein a first base model of the one or more base models comprises at least some layers of the second subset.

4. The system as recited in claim 3, wherein the first subset of layers is closer to an output layer of the neural network-based model than the second subset of layers.

5. The system as recited in claim 1, wherein the one or more base models comprise a first model implementing a first machine learning algorithm, and a second model implementing a different machine learning algorithm.

6. A computer-implemented method, comprising:
implementing a plurality of training iterations for a machine learning task, wherein a particular training iteration comprises:
selecting a batch of unlabeled records of an unlabeled data set associated with the machine learning task;
generating, using at least a portion of a labeled data set associated with the machine learning task, a first version of a stacking model from a second version of the stacking model, wherein the second version corresponds to a previous training iteration;
obtaining, from the first version of the stacking model, respective proposed labels corresponding to individual records of the batch of unlabeled records; and
generating, using the records of the batch and the respective proposed labels, respective first versions of one or more base models from second versions of the one or more base models corresponding to the previous training iteration; and
storing, after the plurality of training iterations is completed, a trained ensemble of models including the stacking model and at least one base model, wherein the trained ensemble of models is obtained from a selected iteration of the plurality of training iterations.

7. The computer-implemented method as recited in claim 6, further comprising:
determining a type of machine learning model to be employed as the stacking model for the machine learning task based at least in part on one or more of: (a) a number of records in the labeled data set, (b) a number of records in the unlabeled data set, (c) availability of derived features corresponding to records of the labeled data set or (d) a problem domain to be addressed by the machine learning task.

8. The computer-implemented method as recited in claim 6, wherein the stacking model comprises a random forest model.

9. The computer-implemented method as recited in claim 6, wherein the stacking model (a) comprises a first subset of layers of a neural network-based model and (b) does not include at least a second subset of layers of the neural network-based model, and wherein a first base model of the one or more base models comprises at least some layers of the second subset.

10. The computer-implemented method as recited in claim 9, wherein the first subset of layers is closer to an output layer of the neural network-based model than the second subset of layers.

11. The computer-implemented method as recited in claim 6, wherein the one or more base models comprise a first model implementing a first machine learning algorithm, and a second model implementing a different machine learning algorithm.

12. The computer-implemented method as recited in claim 6, further comprising:
receiving, via one or more programmatic interfaces, a request to train an ensemble of models for the machine learning task, wherein the plurality of training iterations is implemented in response to the request.

13. The computer-implemented method as recited in claim 6, further comprising:
obtaining, via one or more programmatic interfaces, values of one or more hyper-parameters of one or more of (a) a particular base model or (b) the stacking model.

14. The computer-implemented method as recited in claim 6, further comprising:
obtaining, via one or more programmatic interfaces, values of one or more features corresponding to individual ones of the records of the labeled data set; and
utilizing the obtained values of the one or more features to generate the first version of the stacking model.

15. The computer-implemented method as recited in claim 6, further comprising:
causing to be presented, via a graphical user interface, a visualization of the one or more base models and the stacking model.

16. One or more non-transitory computer-accessible storage media storing program instructions that when executed on or across one or more processors cause the one or more processors to:
implement a plurality of training iterations for a machine learning task, wherein a particular training iteration comprises:
generating, using at least a portion of a labeled data set associated with the machine learning task, a first version of a stacking model from a second version of the stacking model, wherein the older version corresponds to a previous training iteration;
obtaining, from the first version of the stacking model, respective proposed labels corresponding to individual records of a set of unlabeled records associated with the machine learning task; and
generating, using the records of the set and the respective proposed labels, respective first versions of one or more base models from second versions of the one or more base models corresponding to the previous training iteration; and store, after the plurality of training iterations is completed, a trained ensemble of models for the machine learning task, including the stacking model and at least one base model, wherein the trained ensemble of models is obtained from a selected iteration of the plurality of training iterations.

17. The one or more non-transitory computer-accessible storage media as recited in claim 16, wherein at least a first base model comprises a neural network-based model, and wherein the stacking model does not comprise a neural network.

18. The one or more non-transitory computer-accessible storage media as recited in claim 16, wherein the stacking model (a) comprises a first subset of layers of a neural network-based model and (b) does not include at least a second subset of layers of the neural network-based model, and wherein a first base model of the one or more base models comprises at least some layers of the second subset.

19. The one or more non-transitory computer-accessible storage media as recited in claim 16, wherein the one or more base models comprise a first model implementing a first machine learning algorithm, and a second model implementing a different machine learning algorithm.

20. The one or more non-transitory computer-accessible storage media as recited in claim 16, storing further program instructions that when executed on or across one or more processors further cause the one or more processors to:
determine a type of machine learning model to be employed as the stacking model for the machine learning task based at least in part on one or more of: (a) a number of records in the labeled data set, (b) a number of records in an unlabeled data set associated with the machine learning task, (c) availability of features corresponding to the records of the labeled data set or (d) a problem domain to be addressed by the machine learning task.

* * * * *